United States Patent [19]
Malgogne et al.

[11] Patent Number: 5,408,609
[45] Date of Patent: Apr. 18, 1995

[54] COMPUTER ARCHITECTURE HAVING ELEMENTS DISTRIBUTED OVER AND ADAPTABLE TO A PLURALITY OF LOCAL AREA NETWORKS OF VARIOUS TYPES, AND A MICROPROGRAMS ARCHITECTURE THEREFORE

[75] Inventors: Bernard Malgogne, Dreux; Gerald Lyvet, Les Clayes Sous Bois; Remy L. Gallo, Le Chesnay; Josue Bonifas, Montigny Le Bretonneux, all of France

[73] Assignee: Bull S.A., Paris, France

[21] Appl. No.: 810,310

[22] Filed: Dec. 19, 1991

[30] Foreign Application Priority Data
Dec. 20, 1990 [FR] France ................... 90 16031

[51] Int. Cl.⁶ ............................................. G06F 13/10
[52] U.S. Cl. ..................... 395/200; 364/DIG. 1; 364/228; 364/229; 364/229.3; 364/238.6; 364/239; 364/239.3; 364/240; 364/240.8; 364/242.94; 364/242.95; 364/242.96
[58] Field of Search ............... 364/DIG. 1 MS File, 364/DIG. 2 MS File; 395/200, 250, 275, 325, 500, 800

[56] References Cited
U.S. PATENT DOCUMENTS
4,835,674 5/1989 Collins et al. ............... 364/DIG. 1

Primary Examiner—RObert B. Harrell
Attorney, Agent, or Firm—Weingarten, Schurgin, Gagnebin & Hayes

[57] ABSTRACT

A distributed computer architecture eliminates the need for numerous transmission lines that extend beyond the housing of the computer and its communications server, thereby reducing crosstalk and space consumption. The distributed computer architecture includes a plurality of computer systems each connected through communications servers to a plurality of communications networks of various types. Each computer system includes a plurality of terminal adapters that are connected to at least one network of the CSMA/CD type, each terminal adapter being connected to at least one terminal via a respective transmission link, and each terminal adapter managing and transferring frames from the network to an associated terminal, and vice versa, and adapting the protocols and transmission speeds used in the network and on each transmission link.

2 Claims, 7 Drawing Sheets

COMPUTER ARCHITECTURE HAVING ELEMENTS DISTRIBUTED OVER AND ADAPTABLE TO A PLURALITY OF LOCAL AREA NETWORKS OF VARIOUS TYPES, AND A MICROPROGRAMS ARCHITECTURE THEREFORE

FIELD OF THE INVENTION

This invention relates to distributed computer architectures using a local area network of the carrier-sense, multiple-access with collision-detection type (CSMA/CD), and particularly to a distributed computer architecture using local area networks of the Ethernet and Cheapernet types.

BACKGROUND OF THE INVENTION

Communications networks typically include a plurality of data terminal equipment (DTE), also referred to as terminals or stations. A computer connected to a network is considered to be a terminal. Terminals communicate with each other through a transmission medium which may, for example, be a coaxial cable in the case of Ethernet networks (which will be understood to include Cheapernet networks in the discussion below).

The various terminals of a network send information messages and receive those sent by other terminals. An information message is composed of a set of elementary information blocks, called frames, that contain a certain quantity of binary information. Each frame is structured and contains data which define its beginning and its end, the address of the terminal for which the message is intended, the address of the send terminal, the data length, and other useful data.

A local area network (LAN) is a network limited to a geographic location within a restricted area, the distances between the various stations being on the order of a few meters to tens of meters, even reaching a few kilometers. LANs of the CSMA/CD type are frequently used in current practice. They are standardized by the Institute of Electrical and Electronic Engineers (IEEE) in accordance with a standard known as 802.3 (adopted by the International Standards Organization (ISO), as ISO Standard 8 802.3).

This standard defines a number of provisions that establish the communication mode between the various terminals as well as the frame format and the protocol governing dialogs between the various stations. A protocol defines the access rules to the various stations.

Ethernet networks have a data transmission speed of 10 Mbits/s and their standardized transmission medium is a coaxial cable with a characteristic impedance of 50 ohms.

It is known that a computer is composed of one or more central processing units, input/output processors, random access memories, and read only memories associated with all these processors, input/output controllers, as well as several peripherals such as disk memories or input/output peripherals allowing exchange of data with users (screen terminals, printers, etc.), these peripherals being associated with respective peripheral controllers.

All the component parts listed above (aside from the peripherals) are disposed on a set of boards whose dimensions are standardized. These boards are generally connected to a parallel bus which provides communications between the various processors and data transport between the various boards, as well as providing electrical power.

One bus commonly used in present-day practice is called MULTIBUS II, a registered trademark of the INTEL COMPANY. The architecture of such a bus is structured around a principal bus of the parallel type standardized according to IEEE Standard 1296.

The rapid technological evolution of networks and the increasing numbers of terminals in use are leading to the development within the computers themselves of programmed communications servers whose role is to reduce the load on the computer's central processing unit by performing some of the management of the messages sent by the various component elements of the computer to the telecommunications network to which it is connected, as well as the messages coming from other terminals on the network. In current practice, such a communications server is built around a microprocessor connected to one or more memories, which microprocessor works with a basic program (simpler than that of the central processing unit) containing specialized modules allowing the bus common to the various component elements of the computer and the network transmission line to be managed. An example of such a program, called communications software, is the program called CNS which is used in the Bull S. A. Company's DN-7XXX series, and also in the CNS-$A_0$ and CNS-$A_1$ products in the DPS-7000 computer series.

Extremely rapid development in the power and processing capacity of central processing units makes it possible for an increasingly large number of input/output peripherals to communicate with central processing units. These input/output peripherals are synchronous or asynchronous peripherals that communicate with their environment via transmission lines having speeds that range from 300 bits/s to 64 kbits/s. These input/output computer terminals communicate with the outside via modems whose function is to adapt the electrical signal delivered by the input/output terminal to the transmission medium connecting the terminal to its outside environment. These modems are, for example, defined by the V-24, V-28, V-11, V-35, and V-36 standards of the Consultative Committee in International Telegraphy and Telephony (CCITT). These various standards also define the transmission modes and protocols for the corresponding transmission links. These are supported physically by transmission media which are in fact cables or sets of individual wires.

The large computer systems of today, composed of a computer, a communications server, and the various input/output terminals connected thereto, can have as many as several hundred terminals which are thus connected by the same number of cables or sets of wires to the computer. In practice, it is convenient to connect each computer system to other systems and to the input/output terminals via an Ethernet network. When the terminals are distributed in a geographic location within a restricted area, the existence of a large number of cables and wires poses mechanical and physical problems, such as crosstalk, also occupying too much space.

SUMMARY OF THE INVENTION

A distributed computer architecture is provided that includes a plurality of computer systems each connected through communications servers to a plurality of communications networks of various types. The architecture is characterized by each system being connected to a plurality of terminals through at least one network of the CSMA/CD type, and by terminal adapters that form at least one adapter system, each adapter system being connected to the network and to at least one terminal via at least one transmission link, each communications server managing and effecting the transfer of frames from at least one computer system to the network and a plurality of adapters and, conversely, each adapter managing and effecting the transfer of frames from the network to the associated terminal(s) and vice versa, adapting the protocols and transmission speeds used on both the network and the transmission link.

The architecture of the invention eliminates the need for all the transmission lines carried by these cables outside the geographic space occupied by the computer and its communications server. The communications server is then connected to the various terminals through a plurality of adapters whose function is to adapt the transmission speed and transmission protocol of the Ethernet network to the speeds and protocols used in the various transmission lines proper to each input/output terminal. Preferably, a plurality of adapters is grouped in a given geographic space composed of, for example, a backplane containing several of them, e.g., fifteen or more.

The invention provides a distributed computer architecture that includes a plurality of computer systems such as those defined above, each of these systems being composed of a computer, its communications server, and a group of adapters, called an adapter system, that connects the computer to the various input/output terminals. A computer system can also be composed of a set of communications servers.

DESCRIPTION OF THE DRAWINGS

The invention will be more fully understood from the following detailed description, in conjunction with the accompanying figures in which.

DETAILED DESCRIPTION OF THE INVENTION

Figure 1:
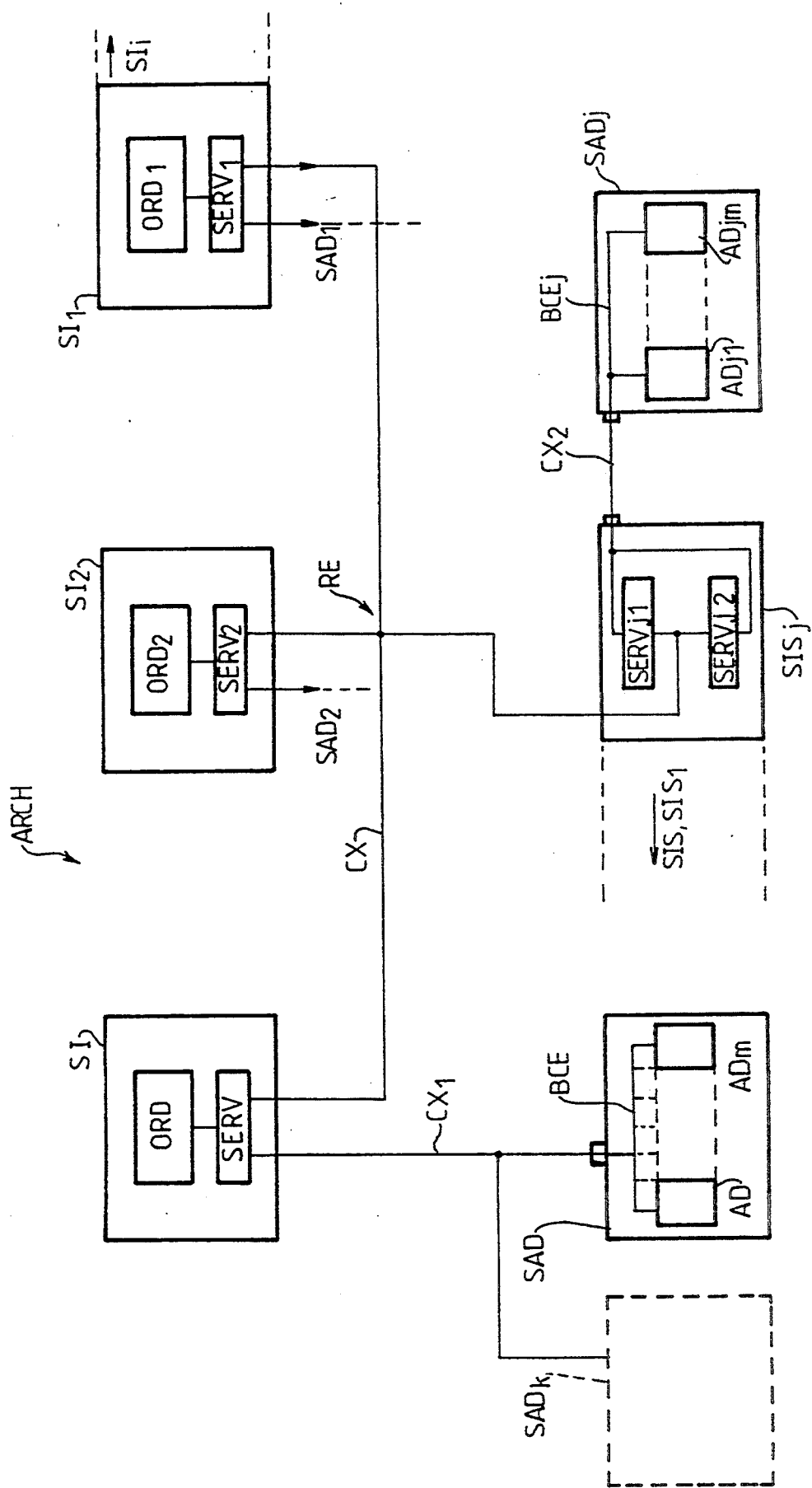
FIG. 1 is a schematic diagram of the distributed computer architecture of the invention.

With reference to FIG. 1, a distributed computer architecture ARCH is shown that includes a plurality of computer systems SI, $SI_1$, $SI_2$, ..., $SI_i$, a plurality of server computer systems SIS, $SIS_1$, ..., $SIS_j$, all being part of an Ethernet network RE whose transmission medium is composed of coaxial cable CX.

The architecture ARCH also includes a plurality of adapter systems such as system SAD connected through a coaxial cable $CX_l$ to computer system SI or the adapter system $SAD_j$ connected through a coaxial cable $CX_2$ to server computer system $SIS_j$. Likewise, computer systems $SI_1$, $SI_2$ can be connected respectively to adapter systems $SAD_1$, $SAD_2$, system $SI_i$ to adapter system $SAD_i$, etc.

Computer systems SI, $SI_1$, ..., $SI_i$ have an analogous structure. Thus, system SI has a computer ORD and a communications server SERV, and computer system $SI_i$ has in the same way a computer $ORD_i$ and a communications server $SERV_i$.

The server computer systems $SIS_j$ all have similar structures and include, for example, a first communications server ($SERV_{j1}$) and a second communications server ($SERV_{j2}$). All the communications servers SERV, ..., $SERV_i$, ..., $SERV_{j1}$, $SERV_{j2}$, etc. have the same structure.

Likewise, adapter systems SAD ... $SAD_j$ all have a similar structure. Thus, for example, the adapter system SAD includes a plurality of terminal adapters (AD, $AD_i$, ..., $AD_m$, etc.) while adapter system $SAD_j$ comprises terminal adapters ($AD_{j1}$, ... $AD_{jm}$, etc.).

Each adapter AD, ..., $AD_m$, $AD_{j1}$, ..., $AD_{jm}$ is associated with a plurality of synchronous or asynchronous input/output terminals, the number of terminals being three in the preferred embodiment of the invention.

Server SERV can, depending on the need, i.e., according to the number of synchronous or asynchronous terminals connected to it, be associated with adapter systems other than SAD, for example, in particular adapter system $SAD_k$ shown in FIG. 1. The same can be true for server computer system $SIS_j$ which can be connected to adapter systems other than system $SAD_j$, according to the number of input/output terminals to which this server computer system is connected.

As stated above, since the computer systems $SI_i$ have an identical structure, as do the server computer systems $SIS_j$ and the adapter systems SAD, $SAD_j$, the remainder of the description will describe only the structure and operation of computer system SI, adapter system SAD, and adapter AD.

Figure 2:
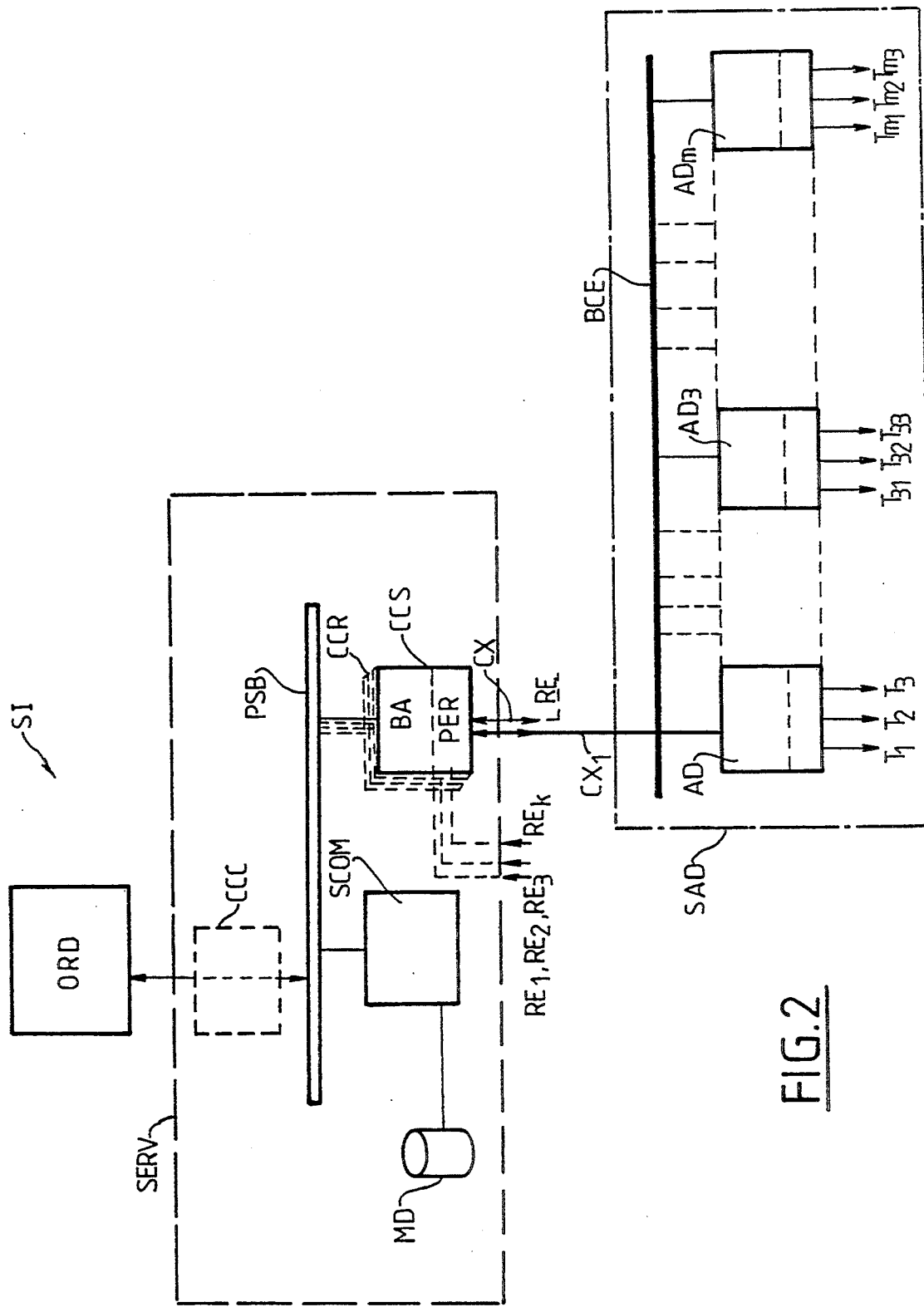
FIG. 2 is a schematic diagram of a computer system that includes a computer, a communications server, and an adapter system that includes a plurality of adapters, each connected to a plurality of input/output terminals.

With reference to FIG. 2, a computer system SI is shown which has at least one computer ORD connected through the server SERV both to the Ethernet network RE and to the adapter system SAD. The computer ORD is also connected through the server SERV to, for example, a set of networks of a different type (other than the Ethernet type), namely $RE_1$, $RE_2$, ..., $RE_k$, through a plurality of links of a different type. The server SERV manages and transfers frames sent by the computer ORD to the networks, and vice versa.

The server SERV includes a central processing unit SCOM which administers and manages the server. In particular, it loads all the programs and microprograms associated with each of the boards of the server when they are initialized.

The server SERV also includes a bus PSB of the parallel type, preferably of the Multibus II type, and a set of communications controllers CCR that allow the server (and hence ORD) to be connected to the various networks RE, $RE_1$, ..., $RE_k$. In particular, the server includes a communications controller CCS that allows the server SERV to be connected to the Ethernet network RE. The server SERV, as a whole, is considered here as a terminal of the network RE, communicating with the other terminals $SERV_1, \ldots, SERV_j, \ldots, SIS_j, \ldots, SAD$.

The computer ORD can be connected either directly to the bus PSB, for example, via a coprocessor MPC 82389 (manufactured by Intel) or, preferably, through a central communications coupler CCC, particularly in the case where several computers other than ORD (not shown) are connected to the server SERV. In this case, the coupler CCC has a structure analogous to the communications controller CCS, and is thus connected to ORD through its peripheral part, as discussed below.

The adapter system SAD includes, as stated above, terminal adapters AD, $AD_1, AD_2, AD_3, \ldots, AD_m$. The adapter AD is associated with synchronous or asynchronous input/output terminals $T_1, T_2, T_3$, while adapter $AD_m$ is associated with input/output terminals $T_{m1}, T_{m2}$, and $T_{m3}$. All the adapters $AD, \ldots, AD_m$ of adapter system SAD are preferably disposed in one and the same physical location including, for example, a backplane carrying a copper bus of the Ethernet or Cheapernet type, namely BCE ($BCE_j$ for $SAD_j$). Each adapter AD is connected to this bus BCE. The bus BCE is also connected to a connecting cable $CX_1$. Thus, the system SAD can be considered a special terminal of the Ethernet network RE.

The frames coming from the computer ORD intended for the network RE arrive through the bus PSB at the communications controller CCS, which divides each of the frames into a plurality of data packets, forms from these data packets a plurality of frames of the Ethernet type, and manages and transfers them to the adapter system SAD, or to other terminals on network RE. Conversely, it receives the Ethernet frames coming either from the system SAD, or other terminals on network RE, divides them into a plurality of data packets, and from these forms frames intended for the computer ORD. It manages and transfers them from network RE to computer ORD.

The role of each adapter is the following: it receives the Ethernet frames coming from the server SERV via cable $CX_1$, stores them, and forms frames whose format is specific to each of the input/output terminals with which it is associated. It then transfers these frames thus formed to each of these terminals. It may thus be said that it converts the frames of the Ethernet type into frames specific to each of the input/output terminals, adapting the protocol and the transmission speed proper to the Ethernet network, to the protocol and transmission speed proper to the specific links of these same terminals. The same work is performed in the other direction, namely from the input/output terminals to the Ethernet network.

Figure 3:
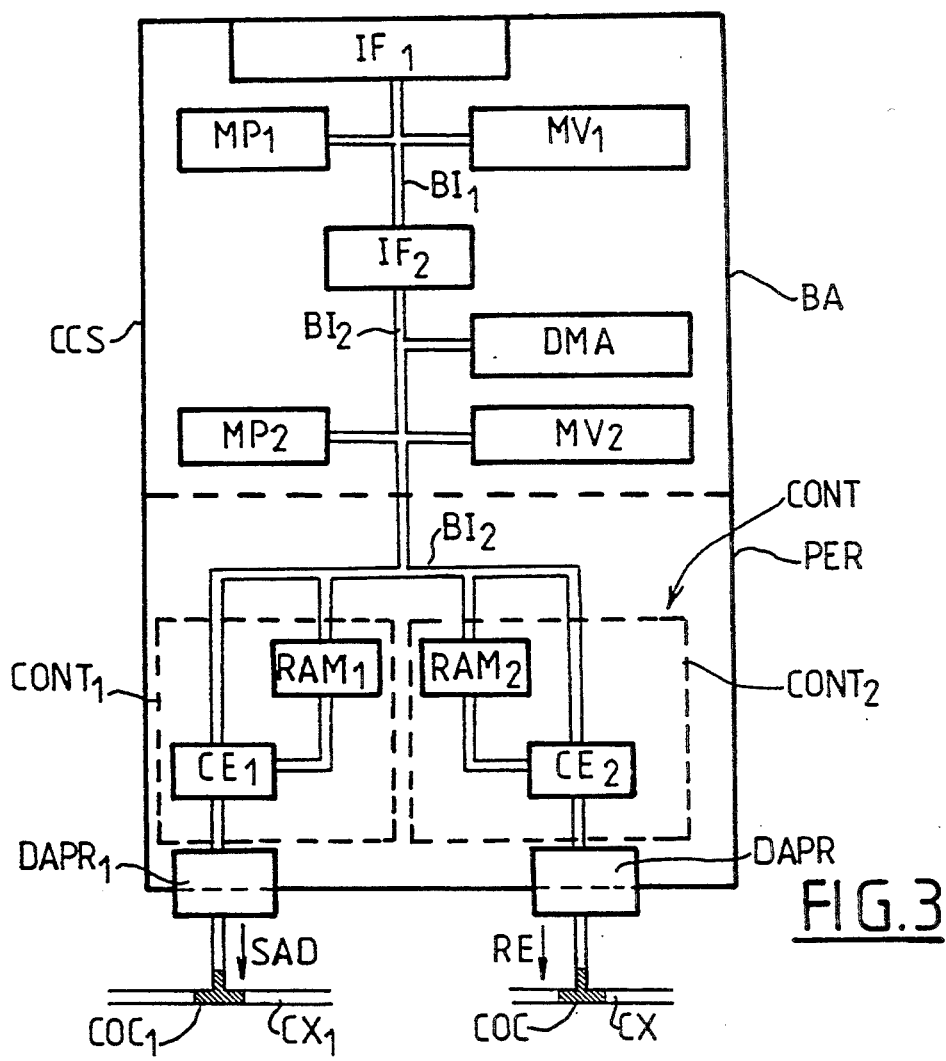
FIG. 3 is a schematic diagram of the physical structure of a communications controller for an Ethernet network of the communications server shown in FIG. 3.

FIG. 3 shows the communications controller CCS, which has a base unit BA and a peripheral unit PER. The base unit BA includes:
an interface $IF_1$ with bus PSB, of the Multibus II type, defined by IEEE Standard P 1296, for example composed of MPC 82389 (see above);
a first microprocessor $MP_1$ of the 68030 type made by the Motorola Company, associated with a first random access memory $MV_1$ with a four megabyte capacity;
a second microprocessor $MP_2$, for example of the 6800 type made by the Motorola Company, associated with a second random access memory $MV_2$ with a 512 kilobyte capacity;
an interface $IF_2$ allowing a dialogue between first and second microprocessors $MP_1$ and $MP_2$, ensuring physical matching of the signals passing through internal bus $BI_1$ of first microprocessor $MP_1$ with those passing through internal bus $BI_2$ of second microprocessor $MP_2$; and
a controller of the DMA (direct access memory) type.

The peripheral unit PER includes:
a controller CONT of the Ethernet type that is driven by a second microprocessor $MP_2$ of base unit BA; and
first and second physical connection devices $DAPR_1$, DAPR for connecting to cables $CX_1$, CX.

The controller CONT is composed of two controllers $CONT_1$ and $CONT_2$ of the Ethernet type, the first of which controllers is connected via the physical matching device $DAPR_I$ to cable $CX_1$ and hence to SAD, and the second is connected via the physical matching device DAPR to the other terminals of network RE.

First controller $CONT_1$ includes:
a send and receive integrated circuit $CE_1$ for a network of the Ethernet type; and
a third random access memory $RAM_1$ with a 64 kilobit capacity, connected to $CE_1$ and to bus $BI_2$ by a bus of the same type as the latter.

Integrated circuit $CE_1$, in one preferred embodiment of the invention, includes an SNIC circuit made by the National Semiconductor Company, with manufacturer's part number 83901. This integrated circuit allows frames to be sent according to the aforementioned standard 8802.3 or frames to be received from network RE according to this standard. In particular, such an integrated circuit carries out the essential provisions of the standard relating to sending problems and to frame receive and collision detection problems. Hence, such a circuit includes a send circuit, a receive circuit, a carrier detection circuit, and a collision detection circuit, as well as a coding and decoding device which allows frames to be sent by a code of the Manchester type for example, or frames sent by this code to be received. For further details concerning the composition of integrated circuit $CE_1$, reference should be made to the manufacturer's technical data sheets.

In the embodiment described here, CE, is connected to $CX_1$ via a transceiver of the standard Cheapernet type, disposed on the board carrying CCS, and via a standard T-connector $COC_1$, itself connected to coaxial cable $CX_1$. $COC_1$ is not on the board carrying CCS.

Transceiver $CAC_1$ thus constitutes physical matching device $DAPR_1$.

Controller $CONT_2$, identical to $CONT_1$, includes:
an integrated circuit $CE_2$ for sending or receiving frames of an analogous type to $CE_1$; and
the fourth random access memory $RAM_2$ connected both to integrated circuit $CE_2$ and to internal bus $BI_2$ of second microprocessor $MP_2$, by a bus of the same type as the latter.

Physical matching device DAPR is identical to physical matching device $DAPR_1$, and is thus composed of a standard Cheapernet transceiver physically located on the board which forms communications controller CCS. This transceiver is connected to a T-connector COC on coaxial cable CX.

Figure 4:
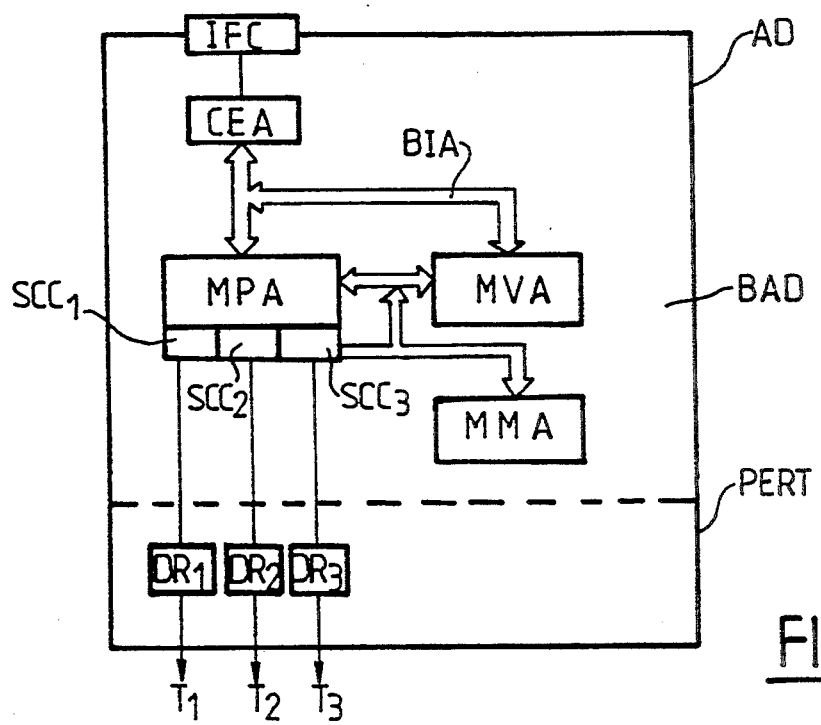
FIG. 4 is a schematic diagram of the physical structure of a terminal adapter of the adapter system shown in FIG. 2.

FIG. 4 shows the physical structure of adapter AD. Adapter AD has a base unit BAD and a peripheral part PERT. Base unit BAD is exactly identical from one adapter to another, while peripheral part PERT differs according to the type of input/output terminals with which the adapter is associated.

Base unit BAD includes:
an interface IFC whose role is identical to physical matching device DAPR or $DAPR_l$ of communications controller CCS. Thus it is composed of a Cheapernet type transceiver connected to cable $CX_1$ via a T-connector (not shown);

a controller CEA of the Ethernet type, exactly identical to integrated circuit $CE_1$ or $CE_2$;

a microprocessor MPA, associated both with a random access memory MVA with a 512 kilobyte capacity and with a programmable read-only memory MMA; and the three identical serial communications controllers $SCC_1$, $SCC_2$, $SCC_3$, each of them associated with a particular terminal, controller $SCC_1$ being associated with terminal $T_1$, controller $SCC_2$ with terminal $T_2$, and controller $SCC_3$ with terminal $T_3$.

In a preferred embodiment of the invention, microprocessor MPA and the three controllers $SCC_1$ to $SCC_3$ are composed of a microcontroller 68302 from the Motorola Company (it is known that such a microcontroller is in fact formed by the combination of a 68000 type microprocessor and a peripheral part formed of serial communications controllers. Microprocessor 68000 thus constitutes microprocessor MPA while the three controllers $SCC_1$ to $SCC_3$ constitute the peripheral part of microcontroller 68302).

Peripheral part PERT is composed of three line drivers $DR_1$, $DR_2$, and $DR_3$ corresponding respectively to terminals $T_1$, $T_2$, and $T_3$ and to serial communications controllers $SCC_1$ to $SCC_3$.

As can be seen in FIG. 4, the elements CEA, MPA, and MVA are connected to the internal bus BIA of microprocessor MPA, the latter also being connected to memories MVA and MMA by a bus of the same type as BIA.

Line drivers $DR_1$, $DR_2$, and $DR_3$ are, for example, composed of elements 3487–3486 from the National Semiconductor Company. The line drivers provide electrical matching of the voltage levels used in integrated circuits of the TTL type (0 and 5 volts) such as those constituting adapter AD, at the level used on the links allowing the adapters to be connected to terminals $T_1$, $T_2$, and $T_3$.

It should be pointed out that each adapter such as AD has a 48 bit Ethernet address assigned to it by its manufacturer. This address is written in memory MMA and is hence accessible by microprocessor MPA. Likewise, each adapter, as soon as it is inserted into its backplane, knows, through microprocessor MPA, its geographic location in the backplane and the backplane number assigned arbitrarily by the manufacturer. This forms its geographic address which is written at the backplane itself by an appropriate coding device which reads microprocessor MPA as soon as the adapter is inserted into its backplane.

The operation of server SERV through the operation of communications controller CCS will now be considered. In the preferred embodiment of FIG. 2, the controller CCS supports two data channels $C_1$ and $C_2$ corresponding respectively to the set of adapters AD . . . $AD_m$ in adapter system SAD, and to the other network RE terminals, namely $SI_1$. . . $SI_i$. . . $SIS_j$, etc. Several different types of controllers CCS may exist. These various types of controllers may handle:

either a single data channel corresponding to one adapter system SAD; or two channels each corresponding to an adapter system; or as stated above, one channel $C_l$ corresponding to one adapter system and one channel $C_2$ corresponding to the other terminals on network RE ($SI_1$. . . $SI_i$. . . $SIS_j$); or a single channel corresponding to the terminals on network RE other than SAD ($SI_1$. . . $SI_i$. . . $SIS_j$); or include two or more channels dedicated exclusively to terminals such as $SI_1$, . . . $SI_i$. . . $SIS_j$.

It will be considered that CCS supports the two channels $C_1$ and $C_2$ defined above.

First processor $MP_1$ controls the transfer of frames circulating on bus PSB destined for the terminals on network RE including SAD: in this capacity it receives them and stores them in its random access memory $MV_1$ while waiting for them to be actually transferred to network RE. Conversely, it receives in its random access memory $MV_1$ the frames coming from network RE before sending them via bus PSB to ORD.

On sending, the first processor cuts up each of the frames into a plurality of data packets such as $BF_1$, $BF_2$, . . . , $BF_n$. $MP_1$ assigns to each of them a specific physical location in random access memory $MV_1$. As soon as one of the two data channels $C_1$ or $C_2$ (see above) becomes available, the first processor asks the second processor $MP_2$ to transfer each of the frames, packet by packet, from random access memory $MV_1$ to controller CONT, then network RE, on the appropriate channel, for example $C_1$, through internal buses $BI_1$, $BI_2$ and interface $IF_2$, then to form Ethernet frames from the data packets and send them to network RE. In other words, the first processor manages the transfer of each of the frames it receives from PSB or network RE, through the two channels $C_1$ and $C_2$ assigned to each frame, both when sending and when receiving. In the receive mode, physical locations in $MV_1$ are assigned by $MP_2$ to the various data packets of which each frame is composed, designated $BF_{101}$ to $BF_m$ for example, these locations being different from those assigned to $BF_1$. . . $BF_n$.

Second processor $MP_2$, having received the transfer request from first processor $MP_1$, transfers each frame, packet by packet, on channel $C_1$ from first memory $MV_1$ to peripheral part PER, where the data packets of the latter are stored in one of the two random access memories $RAM_1$ or $RAM_2$, depending on whether the frame in question, which we will designate by the generic term bus frame, is intended for one of the SAD adapters or for any other RE terminal.

From the various data packets of one bus frame, second processor $MP_2$ makes up frames known as Ethernet frames having a length ranging between a minimum length and a maximum length established by the aforesaid standard 8802.3. Such a frame is composed of several data packets stored in memory $MV_1$ by first processor $MP_1$. In fact, in a preferred embodiment of the invention, every packet stored in memory $MV_1$ and formed by first processor $MP_1$ has a given parametrizable length, for example 200 bytes, while the maximum length of an Ethernet frame is 1500 bytes. An Ethernet frame can thus be, for example, formed by the combination of eight data packets. $MP_2$ arranges the order of the latter, so that they are physically located one after the other in memory $RAM_1$.

As soon as controller CONT receives from second processor $MP_2$ the order to transfer an Ethernet frame to network RE, one of the two integrated circuits $CE_1$ or $CE_2$ will look for the data forming the frame stored in random access memory $RAM_1$ or $RAM_2$ and transfer these data to SAD or the other RE terminals in accordance with the provisions of the aforesaid standard 8802.3.

In the receive mode, second processor $MP_2$ transfers the Ethernet frame coming from network RE to the appropriate channel, looking for it in random access memory $RAM_1$, $RAM_2$ where it was stored by one of the two integrated circuits $CE_1$, $CE_2$. The second processor once more cuts the Ethernet frame received into a number of data packets with a maximum length of 200 bytes, these data packets being sent by the latter processor from either of the two random access memories $RAM_1$, $RAM_2$ to first memory $MV_1$ in the locations of the latter that it assigned for this purpose.

The purpose of there being two random access memories $RAM_1$ or $RAM_2$ is to match speeds between the Ethernet speed on network RE which is 10 megabits/s and the processing speed of the frames and data packets constituting them by $MP_1$ and $MP_2$. By the same token, they provide matching between the speeds on network RE and on bus PSB.

The first and second processors $MP_1$, $MP_2$ perform their tasks on instructions from a communications program CNS (see above) and from a microprogram AML, respectively.

When communications controller CCS is turned on, communications program CNS and microprogram AML, which are stored on disk memories MD of server SERV, are loaded into random access memories $MV_1$ and $MV_2$, respectively, via the bus PSB, and after the board corresponding to communications controller CCS has been initialized. This initialization occurs under the control of a microprogram stored in a programmable memory of the PROM type stored in base unit BA and not shown in FIGS. 2 or 3 for simplification. The communications program CNS is in fact the operating system of communications controller CCS. This program organizes the linkage work between bus PSB and microprogram AML which has the particular responsibility of transferring each of the frames on channels $C_1$, $C_2$ in both send and receive.

Figure 5:
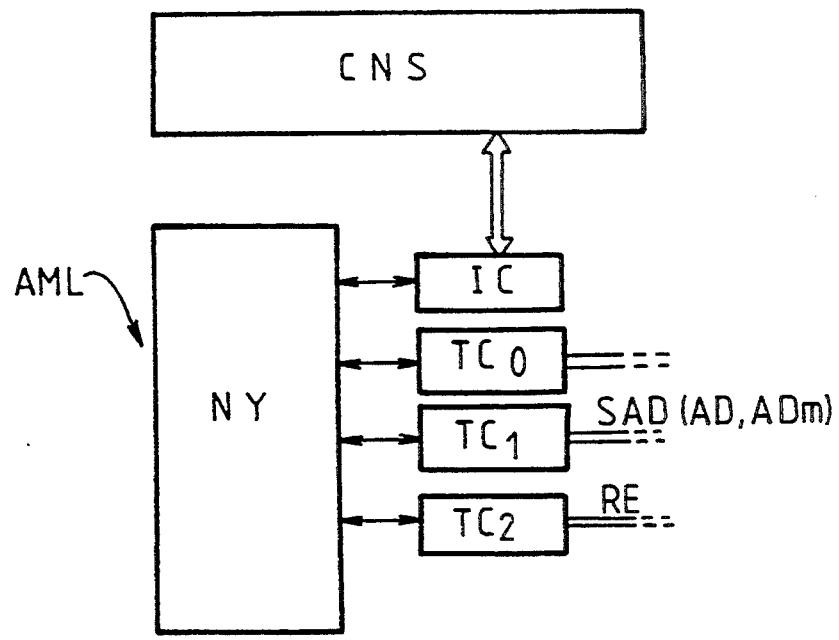
FIG. 5 is a schematic diagram of the program/microprogram package of the communications controller shown in FIG. 3.

FIG. 5 shows the links between the communications program CNS and the microprogram AML. Microprogram AML includes a core NY, a communications interface IC allowing dialoguing between communications program CNS and microprogram AML, as well as a plurality of microprogram modules, also called tasks, namely $TC_0$, $TC_1$, $TC_2$. Modules $TC_1$, $TC_2$ each correspond to two channels $C_1$, $C_2$ defined above. They are thus responsible for transferring the frames assigned to each of these channels from memory $MV_1$ to peripheral part PER and vice versa. Task $TC_0$ is specific to the board on which controller CCS is located. It is used to reset all the components constituting the CCS board to zero.

Each task corresponding to one channel is a task independent of the others. Task sequencing is organized in real time by core NY.

Microprogram AML which receives its commands from program CNS is seen by the latter as a set of three independent tasks. Nonetheless, tasks $TC_0$, $TC_1$, $TC_2$ can operate simultaneously under the control of core NY. Each of them thus has direct links with the latter but has none with the others.

Module IC manages the interface with program CNS. It responds to the requests coming therefrom and switches them to the various tasks corresponding to the various channels so that they can be executed. Symmetrically, it takes care of transfers of status or of data coming from the channels corresponding to each of the tasks, intended for the program CNS.

The exchanges between the base unit BA and the peripheral unit PER are defined by command descriptors. A command descriptor corresponds to a given frame both when sending and when receiving and defines the operations that are to be accomplished on this frame (channel activation on reception and channel deactivation, sending data, and purging a command when a transmission is stopped).

Fuller details on the composition of the command descriptors and the nature of the successive operations performed by task $TC_1$ when a frame $TR_1$ is sent and a frame $TR_{101}$ is received will be found in French Patent Application No. 90.12826, filed on Oct. 17, 1990 by the Applicant Company. The relevant description in this patent application is accordingly incorporated into the present specification by reference.

Figure 6:
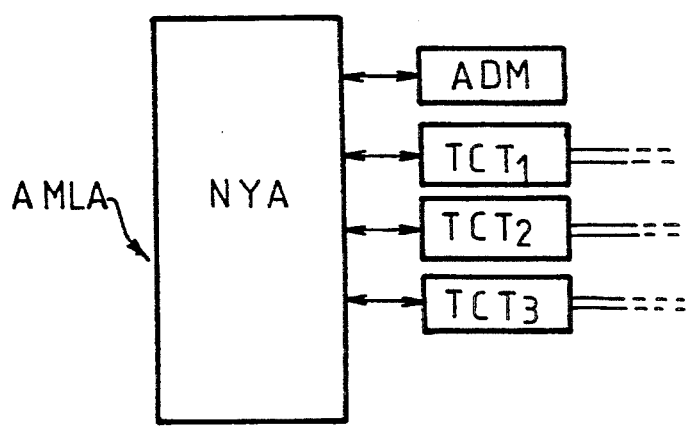
FIG. 6 is a schematic diagram of the structure of the microprogram package of the adapter shown in FIG. 4.

FIG. 6 shows the structure of the microprogram architecture AMLA of any of the terminal adapters, for example adapter AD. This structure is similar to the structure AML of the microprogram architecture of communications controller CCS. The AMLA structure includes:

- a core NYA whose role is identical to that of the core of architecture AML;
- an administration task ADM which is a resident program of adapter AD and is written in read only programmable memory MMA. The task ADM plays a role upon initialization of adapter AD, as will be seen in greater detail in a following part of the specification; and
- three tasks $TCT_1$, $TCT_2$, $TCT_3$ specific to each adapter, which are contained in memory MVA. These tasks are, for example, stored in disk memory MD of server SERV and are transferred from this disk memory to memory MVA via controller CCS, coaxial cable $C_1$, interface IFC, integrated circuit CEA, and the bus BIA when the adapter AD is initialized. The role of these tasks is to manage, organize, and transfer data frames from terminals $T_1$, $T_2$, $T_3$ to network RE, including SERV, and vice versa. The role of each of tasks $TCT_1$ to $TCT_3$ will be described in greater detail below in the detailed description of the adapter AD.

Administration task ADM and the three tasks $TCT_1$ to $TCT_3$ are independent of each other, their work being organized in real time by the core NYA.

Figure 7:
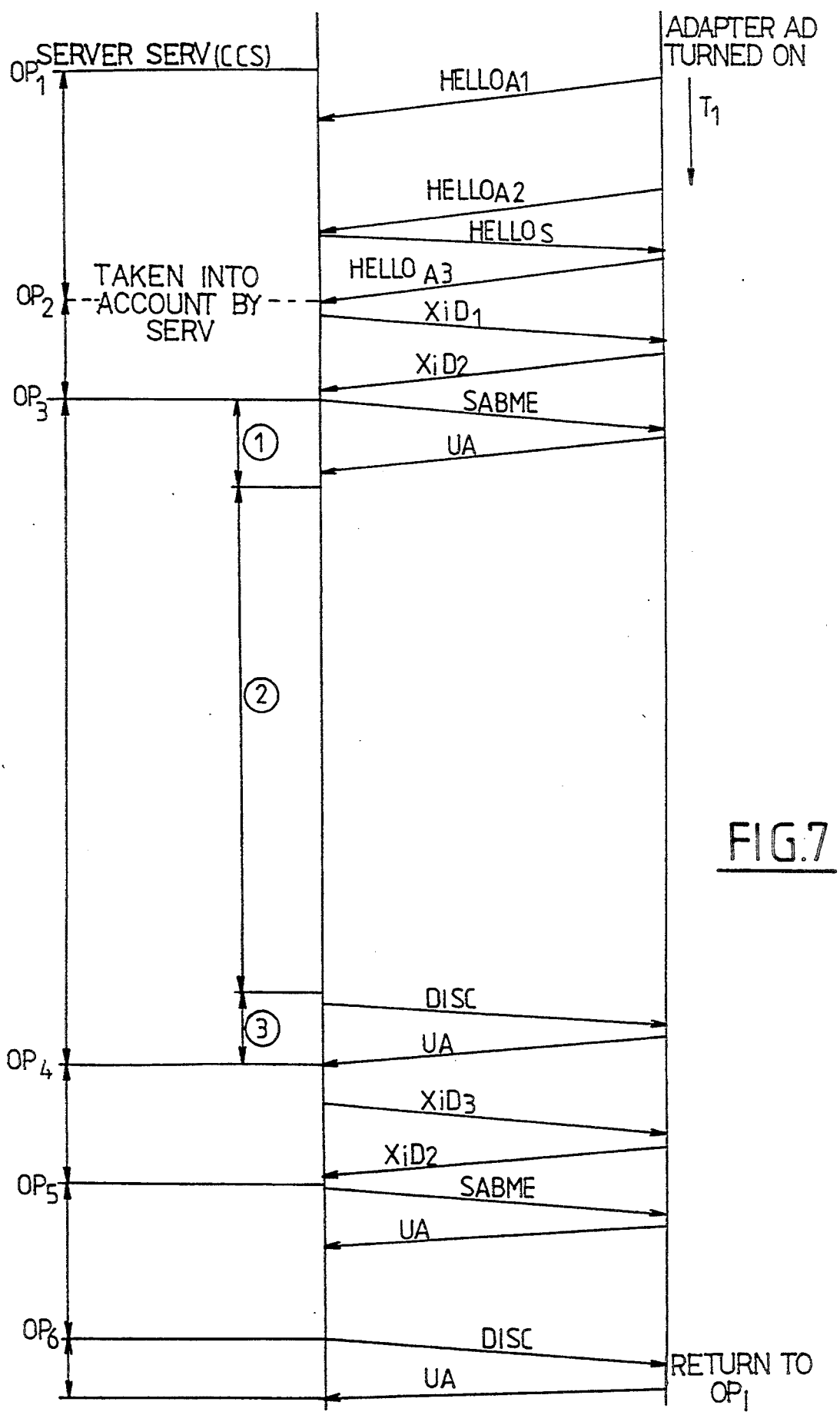
FIGS. 7 and 8 are event sequence diagrams that show how a communications server and a terminal adapter exchange data.
Figure 8:
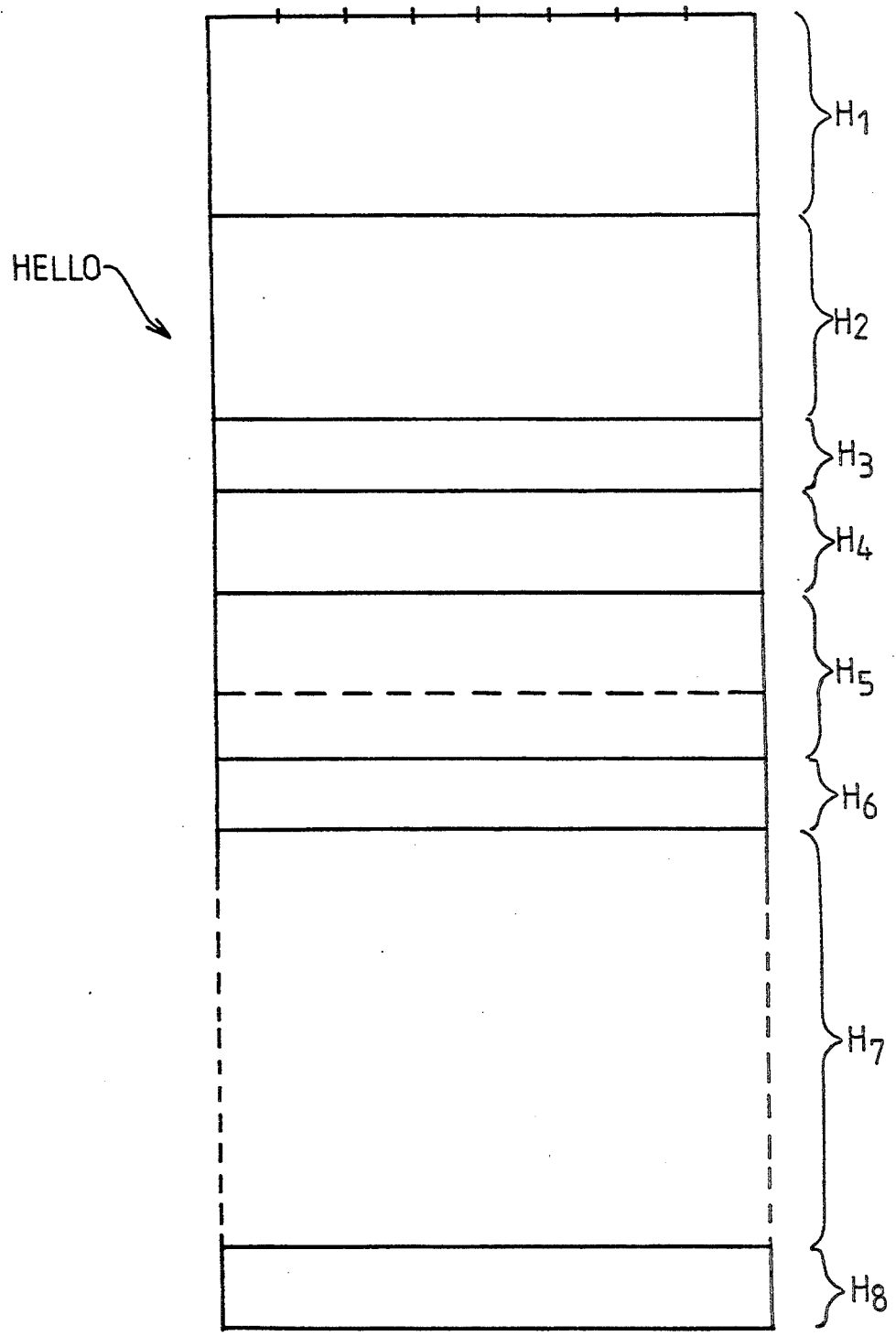

FIGS. 7 and 8 illustrate the detailed operation of the adapter AD. This operation may be broken down into six successive essential operations $OP_1$ to $OP_6$ which are the following:

Operation $OP_1$

This operation starts when the adapter is switched on. The latter sends a message of the "HELLO" type, here designated $HELLO_{A1}$, which is sent to all the servers of the various computer systems constituting the architecture ARCH according to the invention. Thus, server SERV receives this message of the HELLO type as well as servers $SERV_i$, $SERV_j$. In this message, whose detailed structure will be described in relation to FIG. 7, the adapter says what it is, i.e., the adapter indicates the nature of the function it carries out in the computer system to which it belongs, the position it occupies, and the backplane number in which it is located, its type (there may be several successive versions of a given adapter performing the same function), and its Ethernet address memorized in MMA, as stated above.

If no server responds to first message $HELLO_{A1}$, adapter AD resends a message $HELLO_{A2}$ identical to the former message, $T_1$ seconds after the latter has been sent (this time $T_1$ defined by a clock inside the adapter is fairly long, on the order of a few minutes). In response to this second message $HELLO_{A2}$, one of the servers, for example server SERV (and hence its communications controller CCS) believes it is ready to handle any type of later message sent by adapter AD. For this purpose, it sends to the latter a message of the HELLO type, here designated $HELLO_S$, a message whose structure is similar to that of one of the two messages $HELLO_{A1}$–$HELLO_{A2}$. In this message, the server indicates which it is, its type, and its Ethernet address.

The detailed structure of a message of the HELLO type appears in FIG. 8. Such a message includes the following parts $H_1$ to $H_8$:

Part $H_1$

This part contains six 8-bit bytes. It will be noted that in FIG. 8, bits 1 to 8 of each byte occupy positions such that the least significant bit is on the right and the most significant bit is on the left. This part $H_1$ contains the Ethernet address of the destination system. When the message is sent by an adapter ($HELLO_{A1}$–$HELLO_{A2}$), $H_1$ is an Ethernet address known as "broadcast". This means that all the systems (i,e., all the servers) of the computer systems constituting the architecture ARCH receive this message of the HELLO type sent by the adapter, here AD. In other words, this "broadcast" address is a means of alerting everyone that the adapter wishes to enter into communication with any of the servers. In one embodiment of the invention, for a message such as $HELLO_{A1}$ or $HELLO_{A2}$, all the bits in the six bytes of which this part $H_1$ are composed are equal to 1. In this case where a server sends a message such as $HELLO_S$ to an adapter, this part $H_1$ contains the Ethernet address of the adapter that this server is addressing.

Part $H_2$

This part contains six 8-bit bytes and defines the Ethernet address of the sending system. The first three bytes are assigned worldwide to a given manufacturer, while the next three bytes are assigned by this same manufacturer to each of the systems it manufactures. Thus, the manufacturer can give each system it manufacturer, namely for example each server or each adapter, in the three bytes defined above, the manufacturing serial number of this system. Before sending a message of the HELLO type, the adapter will look for this Ethernet address in MMA and insert it into the message.

Part $H_3$

This part has two bytes and defines the total length of the message in bytes, based on $H_3$, namely the total length in bytes of parts $H_4$ through $H_8$. The role and structure of each of parts $H_1$ to $H_3$ are defined by ISO Standard 8802.3.

Part $H_4$

This part contains three bytes. Its role and its structure are defined by ISO Standard 8802.2 Type 1. It states whether the manufacturer defined a specific protocol, known as a proprietary protocol. In fact, Ethernet standards allow each manufacturer to establish, within the Ethernet standard itself, specific protocols known as proprietary protocols. Where this is so, the value of each of the three bytes constituting this part $H_4$ is determined by the standard.

Part $H_5$

This part imposed by ISO Standard 10178, Appendix B or IEEE Standard 802.1, Supplement A, indicates the owner of the proprietary protocol, here for example the Applicant Company, and indicates the protocol number of this same owner. This is because a given owner may write several protocols. Thus, this part $H_5$ indicates, out of all the protocols defined by the manufacturer, which protocol is being used for the HELLO message.

Part $H_6$

This part has two bytes, the first indicating the version of the protocol indicated in part $H_5$ (a given protocol of a given manufacturer may have several versions). This second byte indicates that there is no filler byte after it to define a boundary between two words. In fact, in a preferred embodiment of the invention, it has been chosen to construct a message out of a whole number of 32-bit words, namely four 8-bit bytes. When a message is sent, words are sent in succession, and the boundary between these words must be determined. The second byte of part $H_6$ thus allows the boundary between two words to be determined.

Part $H_7$

This part, whose number of bytes is variable (provided of course that the total number of bytes of the message is between a minimum value, namely 64 bytes, and a maximum value, namely 1500 bytes, according to the Ethernet standard), defines the parameters of the message which are, in order, the following:
- a functional identifier of the system sending the frame: this identifier defines the nature of the computer system sending the frame, namely either a type $SI_i$ system or a SAD type system (=adapter) or a server computer system such as $SIS_j$;
- the version number of the functional identifier defined above; a functional identifier can have several successive versions by the same manufacturer;
- the type of attachment: this defines the nature of the network to which the functional identifier is attached; in the present case an Ethernet type network, but it can also be a network of the FDDI (fiber optic network) type; and
- the attachment number: a given computer system can have several attachments to a given network. This parameter defines the specific features of the adapter, namely its type, in other words the nature of the terminal(s) with which it is associated, as well as the last system to which this adapter was connected, this being defined by its attachment number, its Ethernet address, and its physical identifier which is specific to the type of system manufactured by the manufacturer. Thus, a machine of the DPS 7000 type made by the Bull Company has a specific physical identifier, while a machine of the DPS 6000 type has another specific identifier. In this part, the geographic address (defined above) occupied by the adapter and the version number of the adapter are also indicated.

Part $H_8$

This part contains the usual Ethernet end-of-frame information which is defined by ISO Standard 8802.3.

Upon reception by the adapter AD of the message $HELLO_S$ sent by server SERV, AD sends back a message of the HELLO type, namely $HELLO_{A3}$ in which part $H_l$ contains the address of server SERV. As soon as the latter receives this message, it decides to take into account all the messages sent by adapter AD. Operation $OP_2$ then begins.

Operation $OP_2$

Server SERV (in fact controller CCS) sends a message $XID_1$ to AD. This message is a connection message, or an identity exchange message. The structure of this message and the contents of each of its constituent parts are defined by ISO Standard 8885. Inside the user data field of this message, defined by the aforesaid standard, is introduced the identifier of the sending system, i.e., the identifier of server SERV, this identifier being defined above. Message $XID_1$ means that server SERV is asking the adopter to open the procedure known as LAP defined by ISO Standard 7776, allowing a linkage between the layers 2 of reference model OSI (also defined by the ISO) relative to server SERV and adapter AD. It will be recalled that the so-called LAP procedure allows securitized information exchanges between two systems with flow control. The LAP procedure of the adapter AD is written in memory MMA.

In response to message $XID_1$, AD sends back a message $XID_2$ with the same general structure as $XID_1$. This message means that the adapter is ready to put the LAP procedure into effect. Operation $OP_3$ follows.

Operation $OP_3$

This operation is subdivided into three suboperations:
suboperation 1: server SERV sends a message SABME to the adapter AD. In response to the latter, the adapter sends back a message UA to the server. The first of these messages means that the server is starting the LAP procedure, and the second means that the adapter also agrees to start it.
suboperation 2: during this suboperation, server SERV transfers to adapter AD where it is stored in memory MVAS, the latest version of the LAP procedure according to the specifications of the manufacturer Bull S. A., known as DSA 77. This procedure also contains the operation relative to the upper layers of reference model OSI, which also conforms to specifications DSA 77.

In addition, when this suboperation 2 occurs, SERV sends to adapter AD the program for transferring data from the adapter to the network and vice versa, namely microprogram package AMLA composed of core NYA and tasks $TCT_1$ to $TCT_3$. The latter are stored in memory MVA.

The LAP procedure, the operation of the upper layers of model OSI, according to specifications DSA 77, as well as microprogram package AMLA, as these are defined above, are transferred from disk memory MD to the adapter where they are loaded into MVA. When this loading into memory MVA is complete, suboperation 3 starts: server SERV sends a disconnect message DISC to adapter AD. This message signifies, first, that loading of the program is complete and, second, that adapter AD can now start the LAP procedure contained in its random access memory MVA. In other words, this means that the LAP procedure contained in read only memory MMA is no longer being used by adapter AD, starting from the time the latter receives this DISC message. In response to the latter, adapter AD sends a message UA to the server. It will thus be seen that, for adapter AD, all the operations $OP_1$ through $OP_3$ are conducted by putting into effect (via the microprocessor MPA) the LAP procedure written in read only memory MMA. Operation $OP_4$ now follows.

Operation $OP_4$

Adapter AD waits for the server to ask it to implement the LAP procedure contained in its read only memory MVA. SERV puts an end to this wait by sending a message $XID_3$ indicating that it is asking AD to establish the LAP procedure contained in MVA. The adapter answers by sending a message $XID_2$ (identical to the message sent in operation $OP_2$). Operation $OP_5$ now follows.

Operation $OP_5$

SERV sends a message SABME (see operation $OP_3$) to the adapter which sends back a message UA. From the start of operation $OP_1$ to this point in time, the work of AD is being performed by MPA under the control of task ADM. SERV and AD then proceed to exchange information between the computer system and the three terminals $T_1$, $T_2$, $T_3$. The way in which the server, through its controller CCS, manages and transfers the information from computer ORD to the network and vice versa has been described above. The way in which adapter AD manages and transfers the information from the network to the terminals and vice versa is described below (under the control of tasks $TCT_1$ to $TCT_3$).

Operation $OP_6$

When the server and adapter AD have completed their exchanges, server SERV sends a disconnect message DISC (see above, at the end of operation $OP_3$) to adapter AD which sends back message UA to the server (see also above, end of operation $OP_3$).

We will now consider the operation of adapter AD when it is exchanging information with server SERV. It will first be assumed that server SERV is sending a frame of Ethernet information intended for terminal $T_1$. Let this frame be TE. It passes through transceiver IFC then through integrated circuit CEA which checks to see that the main provisions of the Ethernet standard are obeyed. Once this is done, it sends the frame through bus BIA to random access memory MVA where it is taken into account by the microprocessor MPA, under the control of task $TCT_1$. The microprocessor MPA examines the framing data of frame TE, notes that the data therein are intended for the terminal $T_1$, extracts the useful data from the frame (excluding framing data pertinent only to the Ethernet standards) and adds to these useful data, framing data pertinent to the nature of the link associated with the terminal $T_1$. Once this is done, it transmits the data to serial communications controller SCC₁ which transmits these data serially to the terminal T₁ via the line driver DR₁.

Conversely, for a frame sent by the terminal T₁ to server SERV, namely a frame TL, the latter passes through the line driver DR₁ and is transmitted to serial communications controller SCC₁, which transmits it to the microprocessor MPA which stores it in memory MVA. There it reads the framing data of this frame, notes that it is intended for the server SERV, extracts the useful data, and adds framing data such as to constitute an Ethernet frame. As soon as this is completed, the Ethernet frame thus formed passes through bus BIA of integrated circuit CEA and of transceiver IFC to coaxial cable CX₁ which routes it to the server.

It will be seen that the operation of adapter AD is, in its main features, analogous to the operation of controller CCS, as memory MVA alone plays a role analogous to that of the set of memories MV₁, MV₂, and RAM₁–RAM₂, microprocessor MPA alone plays a role analogous to that of the set of microprocessors MP₁ and MP₂, and circuit CEA plays a role analogous to that of CE₁ or CE₂. In the same way, the role played by the LAP procedure written in MVA is related to that of the CNS program and the role of AMLA is similar to that of AML.

Moreover, just as in CCS, microprocessor MPA defines command descriptors for each frame received or to be sent, and cuts each of these up into a plurality of data packets to which it assigns locations fully defined in memory MVA. It will thus be useful, for further details, to refer to the above-mentioned French Patent No. 90.12826 to find out the structure of the command descriptors and the way in which the command descriptors and data packets articulate with each other inside MVA.

Figure 9:
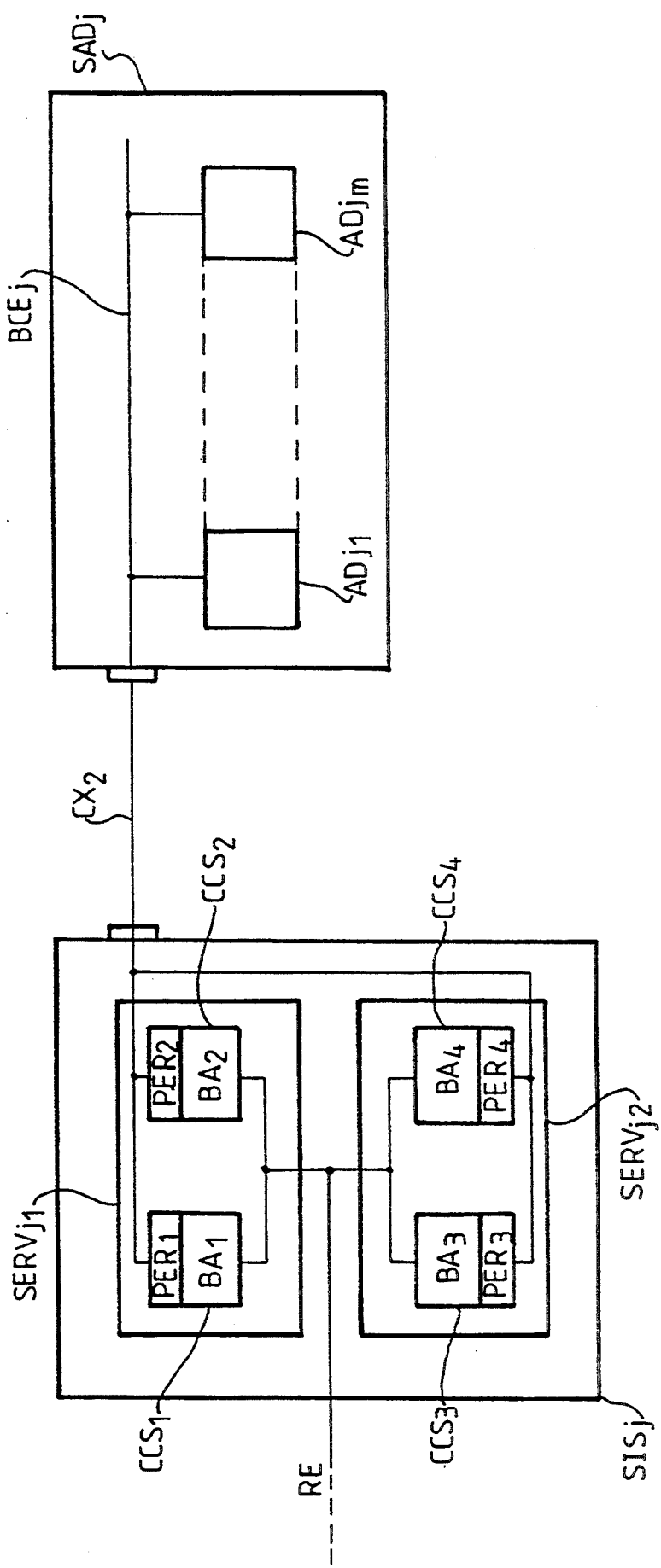
FIG. 9 is a schematic diagram of a preferred embodiment of a server computer system according to the invention.

FIG. 9 shows a server computer system SIS$_j$ which ensures transfer of information from an adapter system SAD$_j$ to network RE with a maximum of security without the transfer of the frame from the network to the adapter system or vice versa being interruptable at any time and for any reason (server down, maintenance being done, etc.)

Server computer system SIS$_j$ thus includes two servers SERV$_{j1}$ and SERV$_{j2}$. SERV$_{j1}$ includes two communications controllers CCS₁ and CCS₂, while server SERV$_{j2}$ includes two communications controllers CCS₃ and CCS₄. The four communications controllers CCS₁ to CCS₄ are identical to communications controller CCS shown in FIG. 3. Thus, controller CCS₁ includes a base unit BA₁ and a peripheral part PER₁, and controller CCS₂ a base unit BA₂ and a peripheral part PER₂. Likewise, controllers CCS₃ and CCS₄ respectively comprise base units BA₃ and BA₄ and peripheral parts PER₃ and PER₄.

The four base units BA₁ to BA₄ are connected together to network RE while the four peripheral parts PER₁ to PER₄ are connected together to coaxial cable CX₂ which connects server computer system SIS$_j$ to adapter system SAD$_j$.

More specifically, base units BA₁ to BA₄ are connected to network RE through a communications controller Ethernet of the type described in the aforesaid Patent Application No. 90.12826. The four base units BA₁ to BA₄ and the base unit of this Ethernet controller are thus connected together by the same Multibus II while the peripheral part of the latter is connected to the network RE.

It can thus be seen that a frame TE coming from the network RE and normally passing through the controller CCS₁ can, if the latter is defective or absent, pass through the controller CCS₂. If the latter is in its turn defective, frame TE can pass, through either CCS₃ or CCS₄. Identical reasoning can be applied to controllers CCS₃ or CCS₄ in the case where frame TE normally passes through one or the other of the latter two.

Thus, with system SIS$_j$ in FIG. 9, the probability of a frame TE coming from network RE not arriving at adapter system SAD$_j$ is practically zero.

Other modifications and implementations will occur to those skilled in the art without departing from the spirit and the scope of the invention as claimed. Accordingly, the above description is not intended to limit the invention except as indicated in the following claims.

What is claimed is:

1. A distributed computer architecture comprising:
   a plurality of computer systems, each computer system connected to a corresponding communication server;
   a plurality of communication networks, each of said communication networks having a network protocol and an information transmission speed, wherein each of said computer systems is coupled to at least one of said plurality of communication networks by the corresponding communication server and wherein at least one of said communication networks is a CSMA/CD communication network;
   a plurality of terminals, each of said terminals having at least one transmission link;
   a plurality of adapter systems, each of said plurality of adapter systems including a plurality of terminal adapters wherein each of said plurality of adapter systems is coupled to the at least one CSMA/CD communication network and to the at least one transmission link of a corresponding terminal;
   wherein each communication server is for managing and transferring a CSMA/CD frame between at least one of said plurality of computer systems and at least one of said plurality of adapter systems via said at least one CSMA/CD communication network; and
   each terminal adapter within each of said plurality of adapter systems for managing and transferring CSMA/CD frames between said communication network and each associated terminal and for adapting the protocols and transmission speeds used on said at least one CSMA/CD communication network and said transmission link;
   wherein said terminal adapter comprises:
      a base unit connected to a transmission medium of said communication network; and
      a peripheral part connected both to said base unit and to a plurality of input/output terminals connected to the adapter via a plurality of respective transmission links;
   wherein said base unit receives the CSMA/CD frame from said communication network, stores the CSMA/CD frame, and converts the CSMA/CD frame into a converted frame specific to each of said transmission links of each of said input/output terminals and transfers said converted frame to said plurality of input/output terminals through said peripheral part;
   wherein said base unit comprises:

a physical matching interface adapted to match to a CSMA/CD type interface, said physical matching interface coupled connected to the transmission medium of said communication network;

a CSMA/CD controller, connected to said physical matching interface, for sending and receiving said CSMA/CD frames via said communication network and said physical matching interface; a programmable read only memory;

an adapter random access memory;

an adapter microprocessor connected to said CSMA/CD controller, to said adapter random access memory and to said programmable read only memory, for executing a microprogram architecture; and a serial communication controller coupled to each input/output terminal connected to said terminal adapter, each serial communication controller being assigned to a transmission link connected to each of said input/output terminals;

wherein said CSMA/CD controller transmits said CSMA/CD frames to said communication network via said physical matching interface and to said adapter random access memory under the control of said adapter microprocessor, said adapter microprocessor for storing said CSMA/CD frames in said adapter random access memory, and then for converting said CSMA/CD frames into converted frames specific to said input/output terminals and for sending the converted frames to said serial communication controller wherein said serial communication controller sends said converted frames to said input/output terminals via said peripheral part;

wherein said microprogram architecture comprises:
a core;
an administration task stored in said programmable read only memory; and
a plurality of tasks, each task being associated with an input/output terminal,
wherein said administration task allows said adapter to establish a dialog with the various systems of which the computer architecture, is composed when said adapter is initialized,
each task for transferring frames from an associated input/output terminal to said communication network and for transferring frames from said communication network to the associated input/output terminal,
each task being independent of other tasks, and the sequencing of each task being organized in real-time by said core,
wherein said microprogram architecture is executed by said adapter microprocessor of said terminal adapter according to the steps of:
upon being turned on, sending a terminal adapter acknowledgement message to the entire communication network for indicating terminal adapter identity, terminal adapter address said communication network, and terminal adapter function;
upon receiving said acknowledgment message, a communications server of a computer system sending a server acknowledgment message back to said terminal adapter, said server acknowledgment message being of a like structure to the terminal adapter acknowledgement message;
said server then sending a first connection message for asking said terminal adapter to open a LAP procedure;
upon receiving said first connection message, said terminal adapter sending back to said server a second connection message with a structure identical to said first connection message;
said server and said terminal adapter implementing the LAP procedure;
said server sending to said terminal adapter the contents of said microprogram architecture, including a core NYA and the tasks, and the contents of the latest version of said LAP procedure that said terminal adapter has stored in the random access memory of said base unit;.
said server sending a third connection message for asking said terminal adapter to establish said latest version of said LAP procedure;.
said terminal adapter signifying agreement by sending a message analogous to said second connection message;
said terminal adapter and said server exchanging data between said input/output terminals connected to said terminal adapter and the computer system that contains said server;
said server and said terminal adapter exchanging messages for ending data exchange; and
returning to the step executed upon being turned on.

2. A distributed computer architecture comprising:
a plurality of computer systems, each of said plurality of computer systems including a computer and a communication server;
a plurality of communication networks, each of said plurality of communication networks having a network data protocol and a network data transmission speed;
a plurality of adapter systems, each of said plurality of adapter systems including at least one terminal adapter;
a plurality of terminals, each of said plurality of terminals including a transmission link, each transmission link having a link data protocol and a link data transmission speed;
a plurality of server communication systems,
wherein each of said plurality of computer systems is connected by at least one of said plurality of communication networks to at least one of said plurality of adapter systems and to at least one other computer system of said plurality of computer systems;
wherein each of said plurality of adapter systems is connected to one of said plurality of communication networks and to at least one transmission link coupled to at least one terminal;
wherein each of said plurality of terminal adapters within said adapter system adapts the network data protocol to the link data protocol, adapts the network data transmission speed to the link data transmission speed and manages and transmits network data frames between said communication network and each terminal coupled thereto;
wherein each of said terminal adapters comprises:
a base unit connected to a transmission medium of the communication network; and
a peripheral part connected both to the base unit and to a plurality of input/output terminals connected to the adapter via a plurality of respective transmission links;

wherein said base unit receives network data frames from said communication network, stores the network data frames, and converts the network data frames into converted frames specific to each of the transmission links of each of the input/output terminals and transfers the converted frames to respective ones of the plurality of input/output terminals through said peripheral part;

wherein the base unit comprises:
- a physical matching interface adapted to interface to a network of the type connected to the transmission medium of the communication network;
- a network controller, connected to said physical matching interface, for sending and receiving the network data frames via the communication network and said physical matching interface;
- a programmable read only memory;
- an adapter random access memory;
- an adapter microprocessors, connected to said network controller, to said adapter random access memory, and to said programmable read only memory, said adapter microprocessor for executing a microprogram architecture: and
- a serial communication controller coupled to each input/output terminal connected to said terminal adapter, each serial communication controller being assigned to a transmission link connected to each of the input/output terminals;

wherein the network controller transmits network frames to the communication network via the physical matching interface and to said adapter random access memory under the control of said adapter microprocessor, the adapter microprocessor for storing the network data frames in the adapter random access memory, and for then converting the network data frames into converted frames specific to the input/output terminals and for sending the converted frames to the serial communication controller wherein the serial communication controller sends the converted frames to the input/output terminals via said peripheral part;

wherein the microprogram architecture comprises:
- a core;
- an administration task stored in the programmable read only memory; and
- a plurality of tasks, each task being coupled to a respective one of said plurality of input/output terminals, wherein the administration task allows the adapter to establish a dialog with each of the plurality of computer systems of which the computer architecture is composed when said terminal adapter is initialized, each task for transferring frames from the respective one of said plurality of input/output terminals to said communication network, and for transferring said frames from said communication network to the respective one of said plurality of input/output terminals, wherein each task is independent of the other tasks, and the sequencing of each task is organized in real-time by said core;

wherein the microprogram architecture is executed by the adapter microprocessor of the terminal adapter according to the steps of:

upon being turned on, sending a terminal adapter acknowledgement message to the entire communication network for indicating terminal adapter identity, terminal adapter address in the communication network, and terminal adapter function;

upon receiving the acknowledgment message, a communications server of a computer system sending a server acknowledgment message back to said terminal adapter, the server acknowledgment message being of a like structure to the terminal adapter acknowledgement message;

the server then sending a first connection message for asking said terminal adapter to open a LAP procedure;

upon receiving the first connection message, said terminal adapter sending back to the server a second connection message with a structure identical to the first connection message;

said server and said terminal adapter implementing the LAP procedure;

the server sending to said terminal adapter the contents of the microprogram architecture, including a core NYA and the tasks, and the contents of the latest version of the LAP procedure that said terminal adapter has stored in said adapter random access memory;

the server sending a third connection message for asking said terminal adapter to establish the latest version of the LAP procedure;

said terminal adapter signifying agreement by sending a message analogous to the second connection message;

said terminal adapter and said server exchanging data between the input/output terminals connected to said terminal adapter and the computer system that contains said server;

said server and said terminal adapter exchanging messages for ending data exchange; and returning to the step executed upon being turned on.

* * * * *

UNITED STATES PATENT AND TRADEMARK OFFICE
CERTIFICATE OF CORRECTION

PATENT NO. : 5,408,609
DATED : April 18, 1995
INVENTOR(S) : Bernard Malgogne, et al.

It is certified that error appears in the above-indentified patent and that said Letters Patent is hereby corrected as shown below:

On the title page, and Column 1, lines 1-7, "COMPUTER ARCHITECTURE HAVING ELEMENTS DISTRIBUTED OVER AND ADAPTABLE TO A PLURALITY OF LOCAL AREA NETWORKS OF VARIOUS TYPES, AND A MICROPROGRAMS ARCHITECTURE THEREFORE" should read --COMPUTER ARCHITECTURE HAVING ELEMENTS DISTRIBUTED OVER AND ADAPTABLE TO A PLURALITY OF LOCAL AREA NETWORKS OF VARIOUS TYPES, AND A MICROPROGRAM ARCHITECTURE THEREFOR--.

INVENTORS: Front page, "Gerald Lyvet" should read --Gerard Lyvet-- and "Remy L. Gallo" should read --Remy Le Gallo--.

Column 4, line 5, "$CX_l$" should read --$CX_1$--.

Column 6, line 18, "$DAPR_l$" should read --$DAPR_1$--.

Column 6, line 45, "$CE,$" should read --$CE_1$--.

Column 8, line 5, "$C_l$" should read --$C_1$--.

Column 11, line 45, "$H_l$" should read --$H_1$--.

Column 13, line 15, "$H_l$" should read --$H_1$--.

UNITED STATES PATENT AND TRADEMARK OFFICE
CERTIFICATE OF CORRECTION

PATENT NO. : 5,408,609
DATED : April 18, 1995
INVENTOR(S) : Bernard Malgogne, et al.

It is certified that error appears in the above-indentified patent and that said Letters Patent is hereby corrected as shown below:

Column 17, line 45, " architecture, is" should read --architecture is--.

Signed and Sealed this

Twenty-seventh Day of February, 1996

Attest:

BRUCE LEHMAN

*Attesting Officer*  *Commissioner of Patents and Trademarks*